US009436418B2

(12) United States Patent
Yanagawa (10) Patent No.: US 9,436,418 B2
(45) Date of Patent: Sep. 6, 2016

(54) NON-TRANSITORY STORAGE MEDIUM STORING INSTRUCTIONS EXECUTABLE BY DEVICE CONTROL APPARATUS, DEVICE CONTROL METHOD, AND DEVICE CONTROL APPARATUS

(71) Applicant: BROTHER KOGYO KABUSHIKI KAISHA, Nagoya-shi, Aichi-ken (JP)

(72) Inventor: Ryo Yanagawa, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/668,611

(22) Filed: Mar. 25, 2015

(65) Prior Publication Data

US 2015/0277826 A1    Oct. 1, 2015

(30) Foreign Application Priority Data

Mar. 28, 2014    (JP) .................................. 2014-069733

(51) Int. Cl.
*G06F 3/12*    (2006.01)

(52) U.S. Cl.
CPC ........... *G06F 3/1253* (2013.01); *G06F 3/1285* (2013.01)

(58) Field of Classification Search
None
See application file for complete search history.

(56) References Cited

U.S. PATENT DOCUMENTS

| 2006/0285128 A1* | 12/2006 | Choi ..................... G06F 3/1205 358/1.1 |
| 2008/0018593 A1* | 1/2008 | Park ..................... G06F 3/1204 345/156 |
| 2010/0118321 A1* | 5/2010 | Ebuchi ................. G06F 3/1204 358/1.9 |
| 2011/0292445 A1* | 12/2011 | Kato .................... G06F 3/1222 358/1.15 |

FOREIGN PATENT DOCUMENTS

| JP | 2008-217826 A | 9/2008 |
| JP | 2010-097415 A | 4/2010 |

* cited by examiner

*Primary Examiner* — Marivelisse Santiago Cordero
*Assistant Examiner* — Neil R McLean
(74) *Attorney, Agent, or Firm* — Merchant & Gould P.C.

(57) ABSTRACT

A non-transitory storage medium stores instructions executable by a device control apparatus including a storage for storing a setting value. The instructions cause the device control apparatus to: display a first setting screen for selection of the setting value for each of setting items; when a setting value for at least one of the setting items is changed from a particular setting value to a setting value, set the changed setting value as one of options regarding setting values for at least one changed setting item; display a second setting screen containing the set option being in a selected state, as the setting value for the at least one changed setting item; and for each of the at least one changed setting item, when the setting value determined by a selecting and determining operation differs from the particular setting value, store the determined setting value into the storage.

14 Claims, 9 Drawing Sheets

NON-TRANSITORY STORAGE MEDIUM STORING INSTRUCTIONS EXECUTABLE BY DEVICE CONTROL APPARATUS, DEVICE CONTROL METHOD, AND DEVICE CONTROL APPARATUS

CROSS REFERENCE TO RELATED APPLICATION

The present application claims priority from Japanese Patent Application No. 2014-069733, which was filed on Mar. 28, 2014, the disclosure of which is herein incorporated by reference in its entirety.

BACKGROUND

1. Technical Field

The present invention relates to a device control method, a device control apparatus, and a non-transitory storage medium storing a plurality of instructions executable by a computer of the device control apparatus.

2. Description of the Related Art

In the case where a device is connected to and controlled from an information processing device, a device driver is generally installed on the information processing device to control the device via the device driver. When using a printer as the device, for example, installation of the printer driver on the information processing device enables the information processing device to control the printer and allows a user to make settings for printing to perform printing using the settings.

The printer driver can set various kinds of setting items for printing. Various types of selectable setting values are provided for each of the setting items. The user can change a setting value to a desired value for each of the setting items depending on a purpose and a type of printing, for example.

However, there are a great number of setting items settable by the printer driver. The user has to find a desired one of the large number of setting items to change the setting value in each printing, resulting in usability.

To solve this problem, there is a technique in which the user registers frequently-used setting values as a favorite and selects the favorite before printing to perform printing using the registered setting.

SUMMARY

However, the above-described favorite registering function is often difficult for users (especially, users unfamiliar with operations of mechanical devices) to understand, making it difficult to register settings values as a favorite. Also, even if the user understands how to register, trouble and inconvenience of actual registration increase with increase in the number of setting items for registration.

Accordingly, an object of the disclosure is improving usability when setting a setting value required for controlling a device from a computer.

In one aspect of the disclosure, a non-transitory storage medium stores a plurality of instructions executable by a computer of a device control apparatus. The device control apparatus includes a display and a storage configured to store a setting value for controlling a device. The plurality of instructions, when executed by the computer, cause the device control apparatus to execute: a first screen displaying process in which the display displays a first setting screen thereon for selection of the setting value for each of a plurality of setting items; an option setting process in which when a setting value for at least one setting item of the plurality of setting items is changed from a particular setting value stored in the storage to a setting value as a changed setting value different from the particular setting value, the changed setting value is set as one of a plurality of options regarding setting values for at least one changed setting item which is the at least one setting item corresponding to the changed setting value; a second screen displaying process in which the display displays a second setting screen on which the one of the plurality of options which is set in the option setting process as the setting value for the at least one changed setting item is displayed in a selected state; and a storing process in which, for each of the at least one changed setting item, when the setting value determined by a selecting and determining operation for selecting and determining the setting value is different from the particular setting value, the determined setting value is stored as a selected and changed setting value into the storage.

In another aspect of the disclosure, a device control method, implementable by a computer of a device control apparatus, is for setting a setting value for controlling a device connected to the device control apparatus. The device control method includes: displaying a first setting screen on the display, the first setting screen including a first setting area for designating a first setting value for the particular setting item, the first setting value being different from the default setting value; receiving a first input for designating the first setting value for the particular setting item through the first setting screen; in response to receiving the first input, storing the first setting value in the storage in association with the particular setting item; displaying a second setting screen on the display, the second setting screen including a second setting area that shows the default setting value and the first setting value stored in the storage; receiving a second input for selecting one of the default setting value and the first setting value through the second setting screen; and determining the selected one of the default setting value and the first setting value for the particular setting item.

In still another aspect of the disclosure, a device control apparatus includes: a display; a storage storing a setting value for controlling a device and a plurality of instructions; and a processor. The plurality of instructions, when executed by the processor, cause the device control apparatus to execute steps including: displaying a first setting screen on the display, the first setting screen including a first setting area for designating a first setting value for the particular setting item, the first setting value being different from the default setting value; receiving a first input for designating the first setting value for the particular setting item through the first setting screen; in response to receiving the first input, storing the first setting value in the storage in association with the particular setting item; displaying a second setting screen on the display, the second setting screen including a second setting area that shows the default setting value and the first setting value stored in the storage; receiving a second input for selecting one of the default setting value and the first setting value through the second setting screen; and determining the selected one of the default setting value and the first setting value for the particular setting item.

In still another aspect of the disclosure, a non-transitory storage medium stores instructions executable by a computer of a device control apparatus. The device control apparatus includes a display and a storage storing a default setting value for a particular setting item. The instructions, when executed by the computer, cause the device control apparatus to execute steps including: displaying a first setting screen on the display, the first setting screen including a first setting area for designating a first setting value for the particular setting item, the first setting value being different from the default setting value; receiving a first input for designating the first setting value for the particular setting item through the first setting screen; in response to receiving the first input, storing the first setting value in the storage in association with the particular setting item; displaying a second setting screen on the display, the second setting screen including a second setting area that shows the default setting value and the first setting value stored in the storage; receiving a second input for selecting one of the default setting value and the first setting value through the second setting screen; and determining the selected one of the default setting value and the first setting value for the particular setting item.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

Hereinafter, there will be described embodiments by reference to the drawings.

(1) Configuration of Printing System

Figure 1:
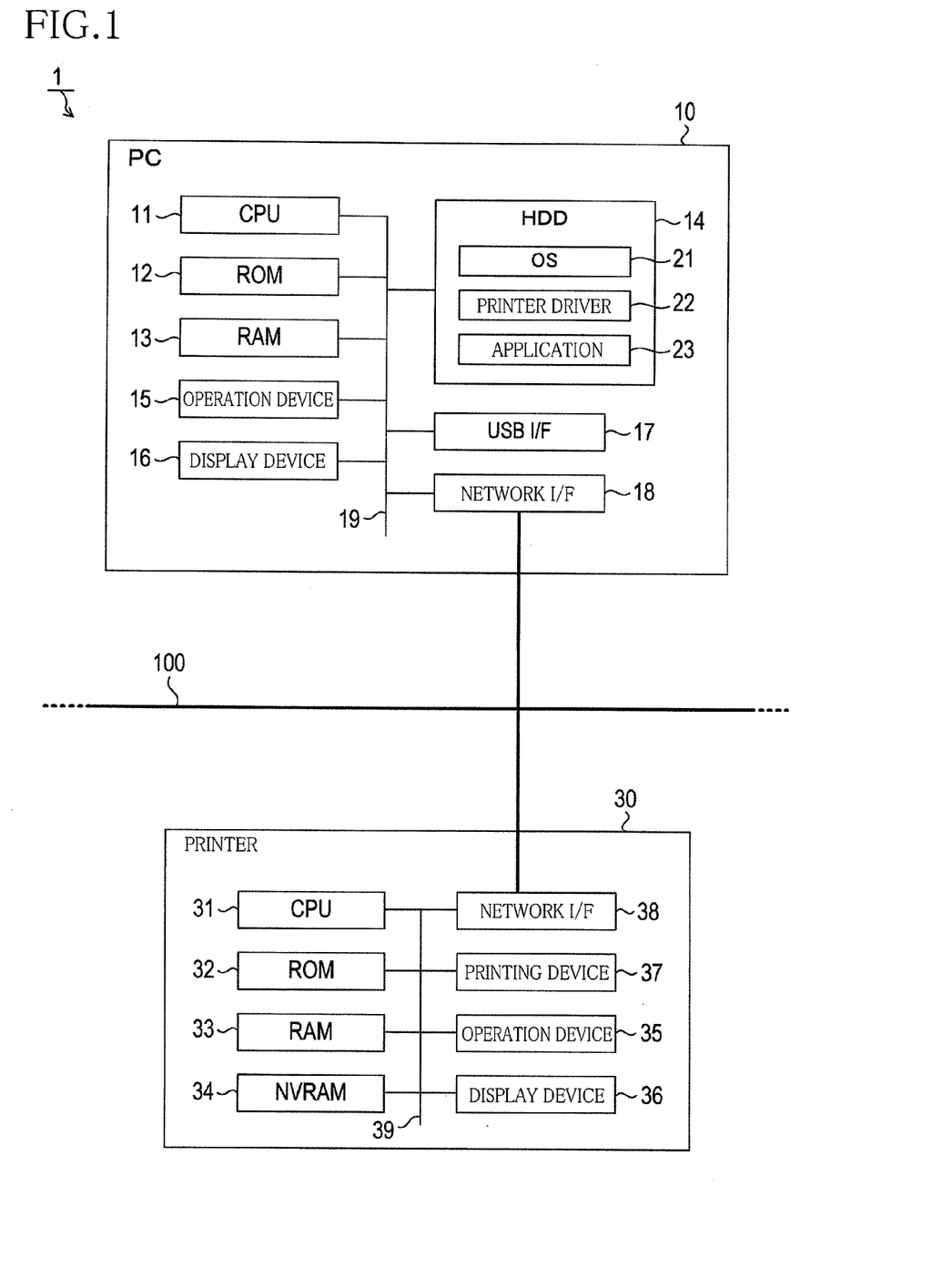
FIG. 1 is a block diagram illustrating a configuration of a printing system.

In one embodiment, as illustrated in FIG. 1, a printing system 1 includes a personal computer (hereinafter referred to as "PC") 10 and a printer 30. Data communication can be performed between the PC 10 and the printer 30 over a LAN (Local Area Network) 100.

The PC 10 includes a CPU 11, a ROM 12, a RAM 13, a hard disc drive (hereinafter referred to as "HDD") 14, an operation device 15, a display device 16, a USB interface 17, and a network interface 18 which are connected to each other by a bus 19.

The HDD 14 is a storage device capable of storing various kinds of software, data, and the like. In the present embodiment, examples of software stored in the HDD 14 include an OS (Operating System) 21, a printer driver 22, and an application 23. That is, the HDD 14 stores programs, data, and the like constituting such software. The ROM 12 is a well-known non-transitory memory which stores particular programs (e.g., a BIOS), data, and the like.

The CPU 11 executes various computations and control for devices of the PC 10 according to various programs, data, and the like stored in the ROM 12 and the HDD 14. The RAM 13 is a transitory memory used as a main memory which is directly accessed by the CPU 11. When executed by the CPU 11, the program stored in the HDD 14 is temporarily read by the RAM 13 and then executed by the CPU 11 according to the program read by the RAM 13.

The operation device 15 includes a keyboard and various kinds of pointing devices. Examples of the pointing devices include a mouse, a touchpad, and a pointing stick. The display device 16 includes a display such as a liquid crystal display or an organic EL display.

The operation device 15 includes a touch panel. Specifically, the touch panel is superposed on a display surface of the display device 16 on which image information is displayed. This configuration allows various kinds of input operations performed by various kinds of touch operations on the touch panel (e.g., tapping, a flick, a swipe, and a drag) in addition to various kinds of input operations performed, on a screen displayed on the display device 16, using the keyboard and the various kinds of pointing devices.

The network interface 18 is a communication interface for connecting the PC 10 to a LAN 100. The USB interface 17 is a communication interface for connecting the PC 10 to various kinds of peripheral devices by USB cables. Where the printer 30 includes a USB interface, the printer 30 and the PC 10 can be connected to each other by a USB cable.

The printer 30 includes a CPU 31, a ROM 32, a RAM 33, an NVRAM (Non-Volatile RAM) 34, an operation device 35, a display device 36, a printing device 37, and a network interface 38 which are connected to each other by a bus 39.

The CPU 31 executes various computations and control for devices of the printer 30 according to various programs stored in, e.g., the ROM 32 and the NVRAM 34. The RAM 33 is used as a main memory which is directly accessed by the CPU 31. The RAM 33 is also used as a buffer for storing print data received from the PC 10. The NVRAM 34 is an electrically rewritable non-transitory memory. The NVRAM 34 stores various kinds of setting information about the printer 30.

The operation device 35 is an input device capable of receiving an input operation performed by the user and includes operation buttons and a touch panel, for example. The display device 36 is constituted by a liquid crystal display, for example. A touch panel constituting the operation device 35 is superposed on a display region of the liquid crystal display.

The printing device 37 includes an ink jet or electronic photographic printing mechanism for printing an image on a recording medium such as a sheet. Upon receiving print data from the PC 10, the printer 30 controls the printing device 37 to print an image based on the received print data. The network interface 38 is a communication interface for connecting the printer 30 to the LAN 100.

(2) Explanation of Software included in PC 10

The OS 21 having a multitasking function is installed on the PC 10 to execute a plurality of processes in parallel. These processes are cooperated to execute various kinds of processings. The printer driver 22 and the application 23 are also installed on the PC 10.

In the following explanation, the CPU 11 which executes a program may be described simply by the name of program. For example, wordings "the printer driver 22 executes" may mean wordings "the CPU 11 executing the printer driver 22 executes". This applies to the OS 21 and the application 23, for example.

Examples of the application 23 include document software, spreadsheet software, and image processing software. In the following explanation, it is assumed that the application 23 is document software.

When the application 23 is activated on the PC 10, and an instruction is provided by the user for printing a document created by the user, the application 23 produces a command for printing the document and transmits the command to the printer driver 22 via the OS 21.

The printer driver 22 is well-known software (e.g., one kind of device driver) for controlling the printer 30 from the PC 10.

When the user of the PC 10 performs a particular print command operation during execution of the application 23 to cause the printer 30 to print a document created using the application 23, the application 23 displays a list of available printers (in the present embodiment, only the printer 30). When the user selects the printer 30 to be used for printing and performs a particular setting-screen displaying operation, information about the operation is transmitted to the printer driver 22, and the printer driver 22 causes the display device 16 to display a driver screen.

Figure 2:
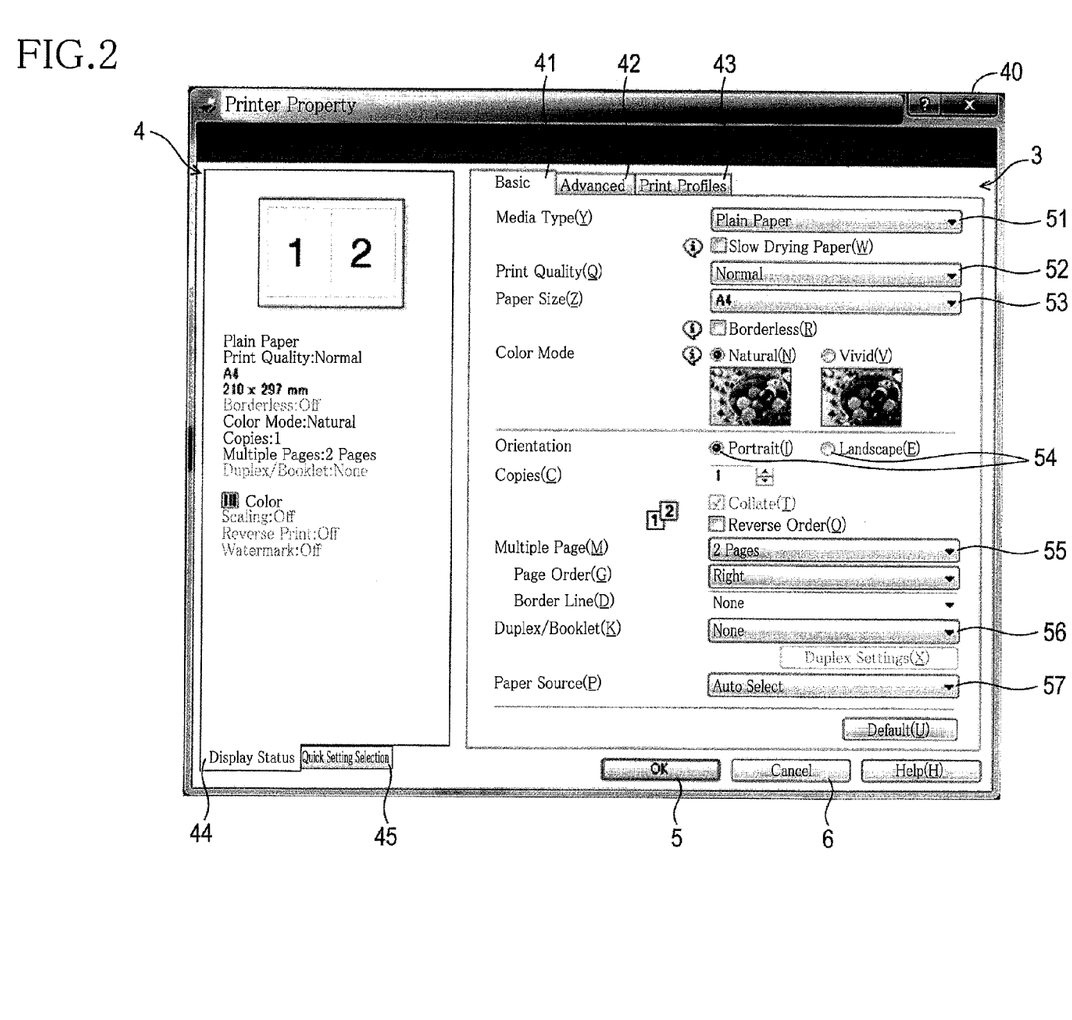
FIG. 2 is a view for explaining a first example of a driver screen.

FIG. 2 illustrates one example of a driver screen 40. The driver screen 40 is displayed, as an independent screen (also called a window), on a specific display area on the display device 16 of the PC 10.

When roughly divided, the driver screen 40 includes a screen right block 3 and a screen left block 4 as display areas. An OK button 5 and a Cancel button 6 are displayed on a lower end portion of the driver screen 40, specifically, below the screen right block 3.

The screen right block 3 contains a Basic tab 41, an Advanced tab 42, a Print Profile tab 43, one of which is selected. That is, on the screen right block 3, all the contents are displayed for one of the three tabs 41-43 (noted that this displaying may be hereinafter referred to as "all-contents displaying"), and only a title of the tab is displayed for each of the other two tabs. By selecting a title of a particular tab, the user can display the tab on the most front side to display all the contents related to the tab. In FIG. 2, all the contents related to the Basic tab 41 of the three tabs 41-43 are displayed on the screen right block 3 as one example.

Examples of specific method of selecting the tab include: a method of performing a left click on the mouse in a state in which a pointer of the mouse is located on a title of the tab; and a method of tapping an input object (e.g., a fingertip) directly on an area of the display device 16 on which the title is being displayed. This applies to an operation of selecting two tabs 44, 45, which will be described below, displayed on the screen left block 4.

In a state in which the Basic tab 41 is selected, as illustrated in FIG. 2, various kinds of setting items which can be set for printing of the printer 30 are displayed on the screen right block 3, and a name of the setting item and a user interface element (hereinafter referred to as "selection UI") for selecting a setting value are also displayed on the screen right block 3 for each of the setting items. As illustrated in FIG. 2, examples of the selection UI include selection boxes, radio buttons, and check boxes. A selecting/inputting operation can be performed on each of the selection UI by the user, and examples of the selecting/inputting operation include the mouse operation and the tapping operation.

In the state in which the Basic tab 41 is selected, the screen right block 3 contains various setting items including Media Type, Print Quality, Paper Size, Borderless (indicating borderless printing), Color Mode, Orientation (indicating a print orientation), Copies (indicating the number of copies), Reverse Order (indicating printing in reverse order), Multiple Pages (indicating a layout), Page Order, Border Line, Duplex/Booklet (indicating duplex printing and booklet printing), and Paper Source (indicating a sheet supply method). The selection UIs are displayed for the respective setting items.

For example, a Media Type selection box 51 is displayed for the setting item "Media Type", and the user can select one of a plurality of media types (e.g., Plain Paper, Thick Paper, and OHP Sheet) contained in the Media Type selection box 51. The selected media type is switched to a selected state. In FIG. 2, the setting value "Plain Paper" is in the selected state.

A Print Quality selection box 52 is displayed for the setting item "Print Quality", and a Paper Size selection box 53 is displayed for the setting item "Paper Size". In FIG. 2, the setting value "Normal" is in the selected state for the setting item "Print Quality", and the setting value "A4" is in the selected state for the setting item "Paper Size".

For the setting item "Orientation", the names of selectable setting values indicating a portrait orientation (Portrait) and a landscape orientation (Landscape) is displayed, and radio buttons 54 are also displayed for the respective setting values. A desired print orientation can be switched to the selected state by selecting one of the radio buttons 54 (Portrait and Landscape). In FIG. 2, the setting value "Portrait" is in the selected state for the setting item "Orientation".

The setting item "Multiple Pages" indicates how many pages are to be printed on each printing sheet in printing of the created document. A Multiple Page selection box 55 is displayed for the setting item "Multiple Pages". The user can select one of a plurality of types of layouts (e.g., 2 Pages, 4 Pages, and 8 Pages) contained in the Multiple Page selection box 55. The selected layout is switched to the selected state. In FIG. 2, the setting value "2 Pages" is in the selected state for the setting item "Multiple Pages".

A Duplex selection box 56 is displayed for the setting item "Duplex", and a Paper Source selection box is displayed for the setting item "Paper Source". In FIG. 2, the setting value "None" is in the selected state for the setting item "Duplex" (that is, duplex printing is not performed), and the setting value "Auto Select" is in the selected state for the setting item "Paper Source".

In initial displaying of the driver screen 40 after the printer driver 22 is installed on the PC 10, a preset initial value (hereinafter referred to as "default value") is displayed in the selected state as each of the setting values for the respective setting items. In the present embodiment, as one example, the default value for the setting item "Orientation" is set at "Portrait", and the default value for the setting item "Multiple Pages" is set at "1 Page". Likewise, for each of the Advanced tab 42 and the Print Profile tab 43, the setting items and the selection UIs are displayed, allowing the user to select the setting values.

When the Cancel button 6 is pressed, the driver screen 40 disappears from the display device 16. In this case, the CPU 11 invalidates input operations which are performed on the driver screen 40 during a period extending from a point in time when the driver screen 40 is displayed on the display device 16 to a point in time when the Cancel button 6 is pressed.

When the OK button 5 is pressed, the driver screen 40 disappears from the display device 16 as in the case where the Cancel button 6 is pressed. In this case, however, each of the setting values being in the selected state at the pressing of the OK button 5 is determined as a corresponding one of the setting values for the respective setting items.

Thus, after the pressing of the OK button 5, when execution of printing is actually instructed, and the print data is transmitted to the printer 30, not only the print data but also information about the setting value determined upon the pressing of the OK button 5 is transmitted to the printer 30. The printer 30 performs printing for the print data based on the transmitted setting values. It is noted that the OK button 5 and the Cancel button 6 are pressed by the mouse operation and the tapping operation, for example.

The screen left block 4 contains the Display Status tab 44 and the Quick Setting Selection tab 45, one of which is selected. That is, on the screen left block 4, all the contents are displayed for one of the two tabs 44, 45, and only a title is displayed for the other tab. The user can selects the title of one of the tabs to display all the contents related to the selected tab. In FIG. 2, all the contents related to the Display Status tab 44 are displayed on the screen left block 4. In the state in which the Display Status tab 44 is selected, a setting value currently being in the selected state is displayed for each of particular one of the settings items related to a selected one of the tabs 41-43 contained in the screen right block 3.

(3) Characteristic Function of Printer Driver 22

In the present embodiment, one of the most characteristic functions of the printer driver 22 is a function of changing a setting value for a particular setting item in a state in which the Quick Setting Selection tab 45 is selected on the screen left block 4 of the driver screen 40. This function will be explained in detail.

Figure 3:
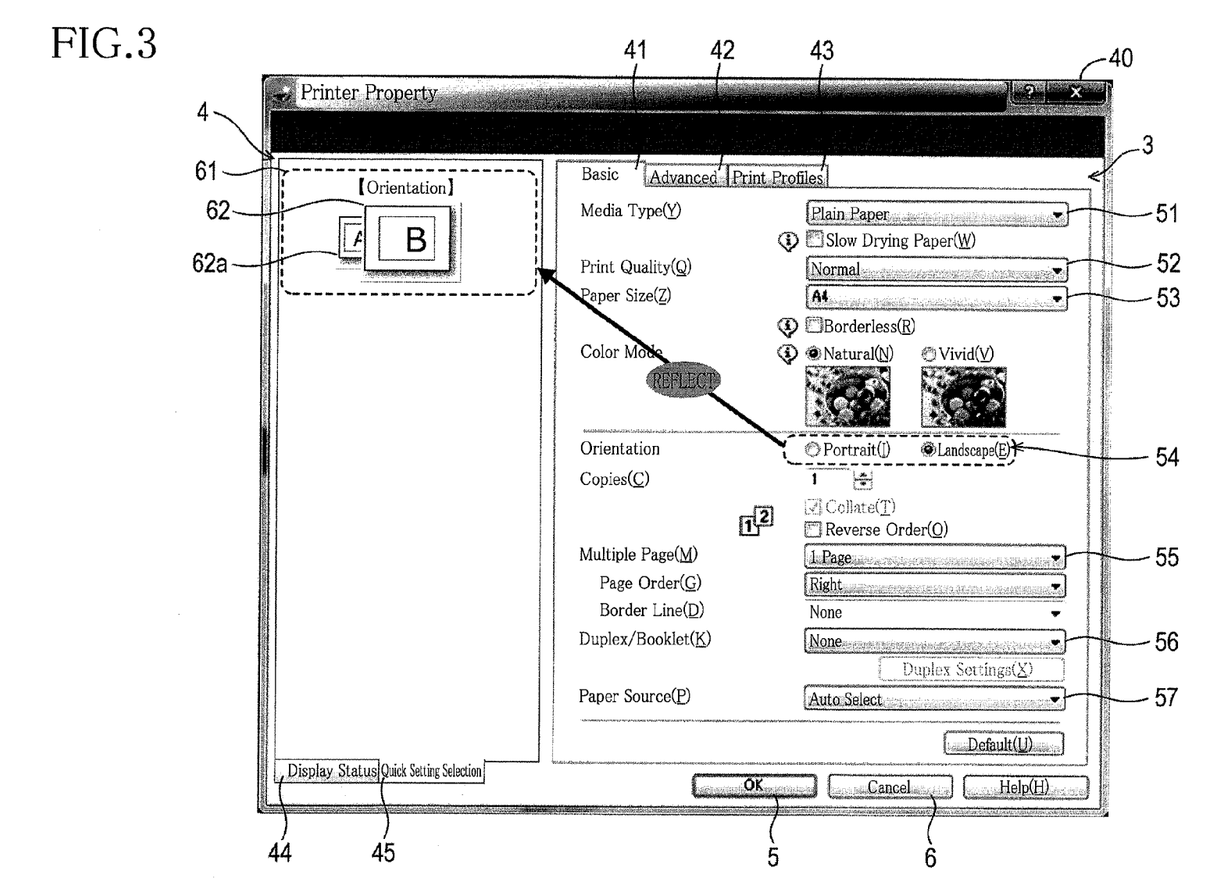
FIG. 3 is a view for explaining a second example of a driver screen.

A specific example will be explained with reference to FIG. 3. In FIG. 3, the Quick Setting Selection tab 45 is selected on the screen left block 4. In initial displaying of the driver screen 40 after the printer driver 22 is installed on the PC 10, no contents are displayed for the Quick Setting Selection tab 45, that is, a blank state is established for the Quick Setting Selection tab 45. On the screen right block 3, in this state, all the setting values related to each of the tabs 41-43 are set at the respective default values.

When this initial state is established in which the Basic tab 41 is selected and when the setting value for the setting item "Orientation" is changed from "Portrait" as the default value to "Landscape", as illustrated in FIG. 3, an Orientation group 61 which is a group corresponding to the setting item "Orientation" is newly added into the screen for the Quick Setting Selection tab 45. Each of the changed setting value (i.e., the setting value after the change) and the default value is added as an option into the Orientation group 61 (specifically, icons indicating the respective values are added). Also, in the state in which the Basic tab 41 is selected, the changed option (the option after the change), i.e., the setting value being in the selected state on the screen right block 3 (the setting value "Landscape" in this case) is displayed also in the Orientation group 61 as the selected state. Specifically, the icon indicating "Landscape" is displayed as a selected-state icon 62 at a center in the group, and the icon indicating the other option (the setting value "Portrait" as the default value in this case) is displayed, on a right or left side of the selected-state icon 62, as a non-selected-state icon 62a having a smaller size than the selected-state icon 62. It is noted that image data indicative of the icon indicating each setting value is contained as a part of the printer driver 22.

In the Orientation group 61, the option being in the selected state can be switched by a particular operation. Specifically, when the icon indicating "Portrait" displayed as the non-selected-state icon 62a is selected by, e.g., the mouse operation or the tapping operation, the selected-state icon 62 to be displayed at the center is switched to the icon indicating "Portrait". Conversely, the icon indicating "Landscape" previously displayed as the selected-state icon 62 is displayed as the non-selected-state icon 62a in a smaller size. Furthermore, when the option being in the selected state is changed from "Landscape" to "Portrait" in the Orientation group 61 as described above, this change is reflected in the screen right block 3. That is, the setting value being in the selected state for the setting item "Orientation" is automatically changed from "Landscape" to "Portrait" on the screen for the Basic tab 41. That is, in the present embodiment, the selected state in the screen for the Quick Setting Selection tab 45 and the selected state in the screen for each of the tabs 41-43 are always in synchronization with each other, so that the same setting value is in the selected state in the screen right block 3 and the screen left block 4.

For some setting items, four or more options are contained in one group in the screen left block 4 in the state in which the Quick Setting Selection tab 45 is selected. In the present embodiment, the number of icons displayable at the same time for one group is three, at most, including the icon being in the selected state at the center (see FIG. 6). Thus, in the case where four or more options are contained in one group, icons indicating some options are hidden without being displayed on the most front side. In this case, the user who wants to select the hidden option can operate the non-selected-state icon on a right or left side or perform a swipe operation on a display area in the group in the right and left direction, for example, to slide the displayed icons in the right and left direction, which can display the hidden icon in the selected state.

When the OK button 5 is pressed in the state illustrated in FIG. 3, i.e., in a state in which the setting value for the setting item "Orientation" is changed to "Landscape", and the setting value "Landscape" is in the selected state, the selected state in this situation is determined and stored into the HDD 14. Also, when the OK button 5 is pressed, the option being in the selected state in each group on the screen for the Quick Setting Selection tab 45 is stored as selection history information into the HDD 14. This selection history information is cumulatively stored each time when the OK button 5 is pressed.

When the driver screen 40 is thereafter displayed again, the CPU 11 controls the display device 16 based on the information stored in the HDD 14 to display the setting values determined by the previous pressing of the OK button 5, such that the setting values are in the selected state. The screen for the Quick Setting Selection tab 45 is displayed in the same manner. After the driver screen 40 disappears in response to the pressing of the OK button 5 in the state illustrated in FIG. 3, when the driver screen 40 is displayed again, the driver screen 40 contains the screen identical to the screen illustrated in FIG. 3. Specifically, for the Quick Setting Selection tab 45, the selection history information is read, and icons indicating the respective setting values and an icon indicating the default value are displayed for each of the groups stored as the selection history information. For each group, an icon indicating the setting value being in the selected state at the previous determination is displayed as the selected-state icon at the center in the group.

Figure 4:
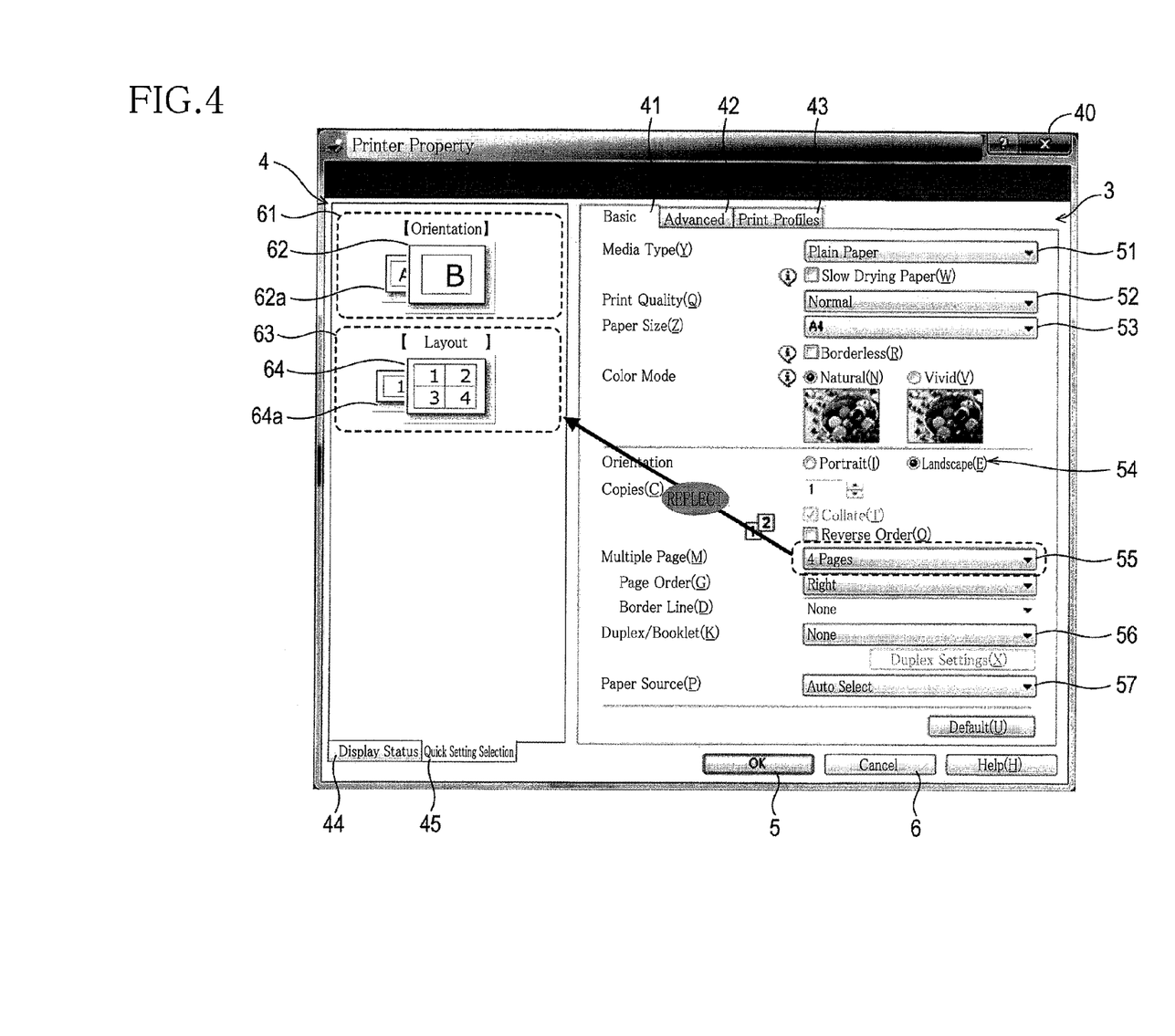
FIG. 4 is a view for explaining a third example of a driver screen.

In the case where a plurality of groups have been added in the screen for the Quick Setting Selection tab 45, the groups are displayed so as to be arranged in the up and down direction (see FIG. 4). In the present embodiment, the number of groups displayable on the screen for the Quick Setting Selection tab 45 at the same time is four at the maximum. Thus, in the case where five or more groups have been added in the screen for the Quick Setting Selection tab 45, some groups are hidden without being displayed. In this situation, in the case where the user wants to change the option being in the selected state for the hidden group, for example, the user can click an up and down arrow, not shown, displayed on the screen for the Quick Setting Selection tab 45 or perform a swipe operation in the up and down direction on the screen for the Quick Setting Selection tab 45 to slide the displayed groups in the up and down direction, which can display the hidden group.

When the setting value for the setting item "Multiple Pages" is changed to "4 Pages" on the screen for the Basic tab 41 in the state illustrated in FIG. 3, for example, as illustrated in FIG. 4, a Multiple Page group 63 which is a group corresponding to the setting item "Multiple Pages" is newly added into the screen left block 4 in the state in which the Quick Setting Selection tab 45 is selected. Each of the changed setting value and the default value is added as an option into the Multiple Page group 63 (specifically, icons indicating the respective values are added). Also, on the screen for the Basic tab 41, the changed option, i.e., the setting value being in the selected state (the setting value "4 Pages" in this case) is displayed also in the Multiple Page group 63 as the selected state. Specifically, the icon indicating "4 Pages" is displayed as a selected-state icon 64 at a center in the group, and the icon indicating the other option (the setting value "1 Page" as the default value in this case) is displayed, on a right or left side of the selected-state icon 64, as a non-selected-state icon 64a having a smaller size than the selected-state icon 64.

The option being in the selected state can be switched in the Multiple Page group 63 as in the Orientation group 61. Also, as in the Orientation group 61, when the selected state is switched in the Multiple Page group 63, the change is reflected in the screen right block 3. For example, when an icon indicating "1 Page" is selected in the Multiple Page group 63, and the icon indicating "1 Page" is thereby changed to the selected-state icon 64, the screen for the Basic tab 41 is switched in synchronization with this change, that is, the setting value being in the selected state for the setting item "Multiple Pages" is also changed from "4 Pages" to "1 Page". When the OK button 5 is pressed in the state illustrated in FIG. 4, the selected state at the pressing is determined and stored into the HDD 14, and the option being in the selected state in each group on the screen for the Quick Setting Selection tab 45 is cumulatively stored as the selection history information into the HDD 14. When the driver screen 40 is thereafter displayed again, the display device 16 displays the driver screen 40 containing the same selected-state icon as displayed on the driver screen 40 illustrated in FIG. 4. Likewise, as for the Quick Setting Selection tab 45, the screen at the previous determination is displayed.

Figure 5:
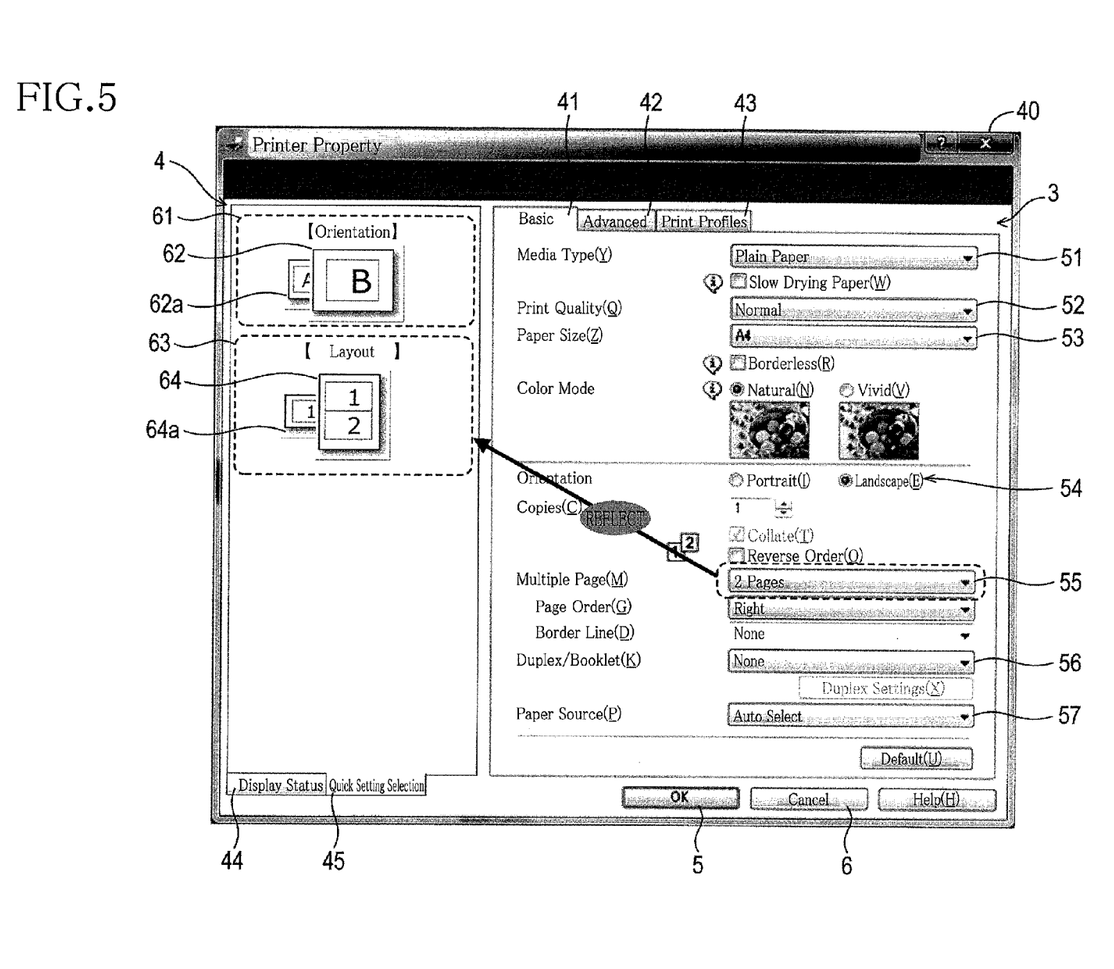
FIG. 5 is a view for explaining a fourth example of a driver screen.

In the state illustrated in FIG. 4, for example, when the setting value for the setting item "Multiple Pages" is changed from "4 Pages" to "2 Pages" on the screen for the Basic tab 41, as illustrated in FIG. 5, the setting value "2 Pages" is newly added, as an option, into the Multiple Page group 63 displayed on the screen for the Quick Setting Selection tab 45. Also, the option "2 Pages" is set to the selected state. That is, the selected-state icon 64 is switched to the icon indicating the option "2 Pages". Conversely, the icon indicating the option "4 Pages" previously displayed as the selected-state icon 64 is dismissed from the Multiple Page group 63. In this example, the option "4 Pages" being in the selected state is not an option previously determined and stored as the selection history information but a temporary option newly selected during current displaying and having not been determined yet. In the present embodiment, even in the case where the temporary option is selected and set as the option being in the selected state on the screen for the Quick Setting Selection tab 45, when another setting value is thereafter selected on the screen for the Basic tab 41, the temporary option is dismissed from the screen for the Quick Setting Selection tab 45.

However, the transition of the screen for the Quick Setting Selection tab 45 from the screen illustrated in FIG. 4 to the screen illustrated in FIG. 5 is one example, and the present invention is not limited to this transition. For example, each time when a new setting value not having been added into the screen for the Quick Setting Selection tab 45 is selected on the screen for the Basic tab 41, the new setting value may be cumulatively added as an option into the screen for the Quick Setting Selection tab 45.

Figure 6:
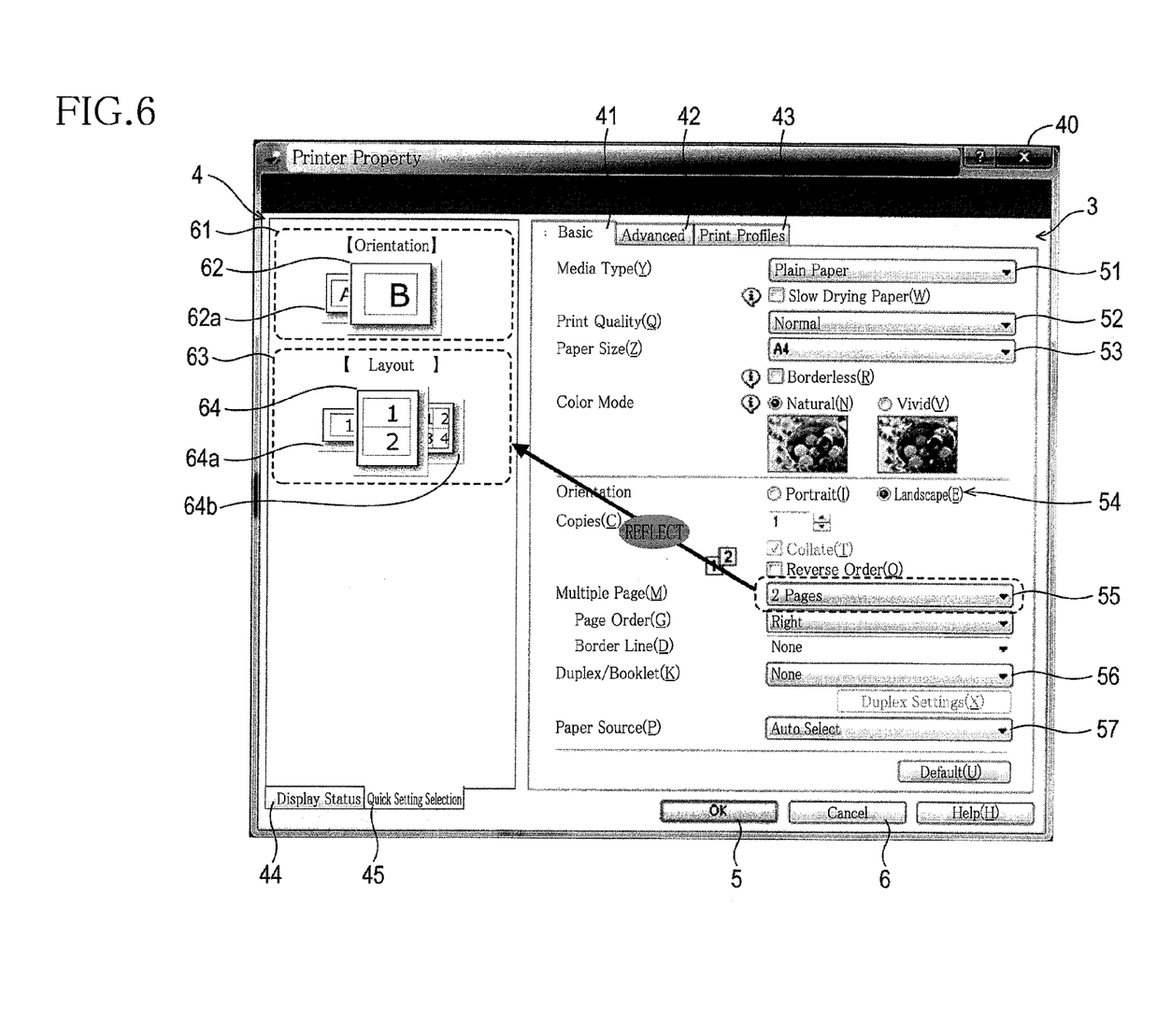
FIG. 6 is a view for explaining a fifth example of a driver screen.

Specifically, in the case where the setting value for the setting item "Multiple Pages" from "4 Pages" to "2 Pages" on the screen for the Basic tab 41 from the state illustrated in FIG. 4, as illustrated in FIG. 6, an option "2 Pages" may be newly added and set in the selected state without removing the option "4 Pages" previously set in the selected state, from the Multiple Page group 63. In this case, when the setting value for the setting item "Multiple Pages" is changed to "8 Pages" on the screen for the Basic tab 41 from the state illustrated in FIG. 6, for example, an option "8 Pages" is added into the Multiple Page group 63 on the screen for the Quick Setting Selection tab 45, resulting in a state in which four options have been added in total. However, since the number of icons displayable at the same time for one group is three, at the maximum, including the icon being in the selected state at the center as described above, an icon indicating the newly added option "8 Pages" is displayed as the selected-state icon 64 at the center, and an icon indicating "1 Page" as the default value is displayed, but one of icons respectively indicating "2 Pages" and "4 Pages" is in a non-displayed state. Alternatively, instead of this configuration, the PC 10 may be configured such that the icon indicating "8 Pages" is displayed at the center, and two icons which are later in being added as options are set in the displayed state among the three icons respectively indicating "1 Page", "2 Pages", and "4 Pages".

As thus described, the PC 10 may be configured such that each time when a new setting value not having been added into the screen for the Quick Setting Selection tab 45 is selected on the screen for the screen right block 3, the setting value is cumulatively added into the screen for the screen for the Quick Setting Selection tab 45. Also in this case, however, an option being in the selected state on the screen for the Quick Setting Selection tab 45 at the pressing of the OK button 5 is stored as the selection history information. That is, even in the case where the screen is changed from the screen illustrated in FIG. 3 to the screen illustrated in FIG. 4 in response to a change of the setting value for the setting item "Multiple Pages" to "4 Pages" on the screen for the Basic tab 41, and thereafter the screen is further changed to the screen illustrated in FIG. 6 in response to a change of the setting value for the setting item "Multiple Pages" to "2 Pages" on the screen for the Basic tab 41, for example, when the OK button 5 is finally pressed on the screen illustrated in FIG. 6, for example, the setting value "2 Pages" being in the selected state at the time is stored as the selection history information, and the setting value "4 Pages" not being in the selected state is not stored as the selection history information for the Multiple Page group 63.

(4) Processing of Printer Driver 22

Figure 7:
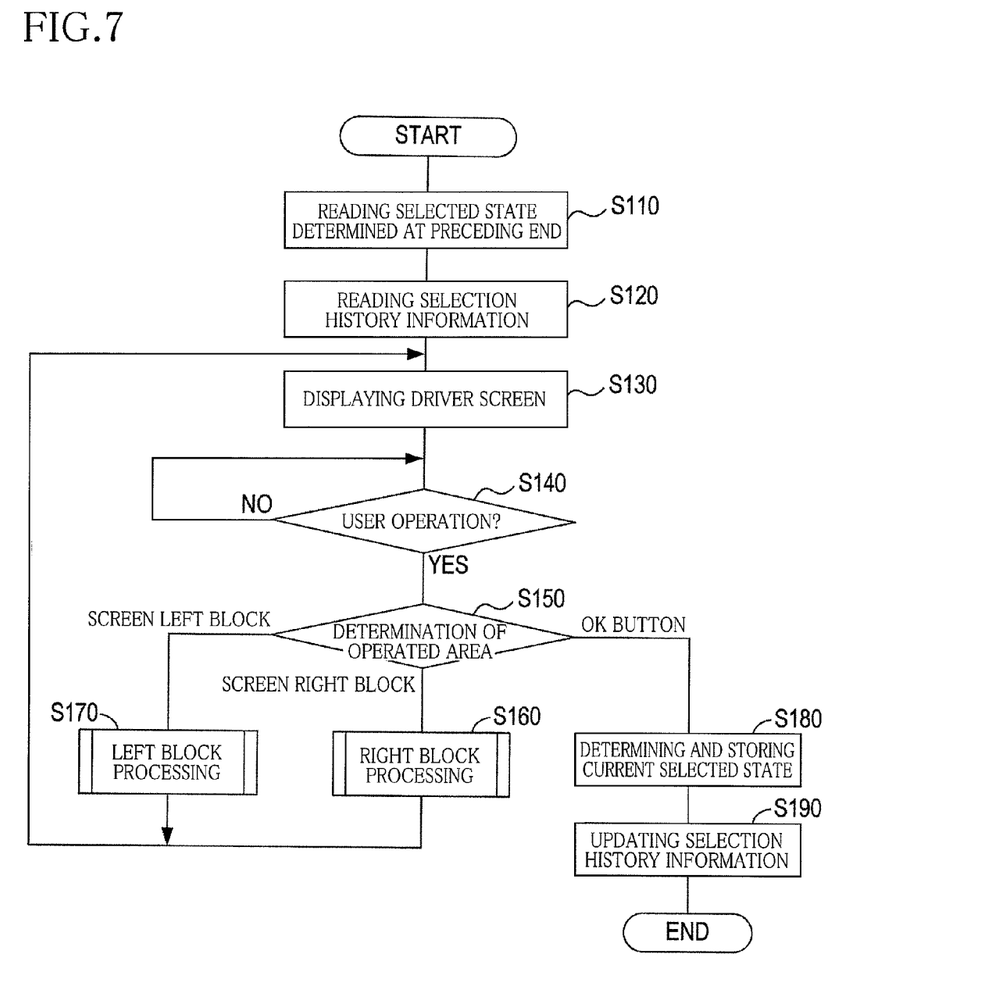
FIG. 7 is a flow chart illustrating processings executed using a printer driver.

There will be next explained, with reference to FIG. 7, processings executed by the CPU 11 of the PC 10 which controls the printer driver 22. The CPU 11 of the PC 10 executes the processings by reading programs of the printer driver 22 at a specific timing. The flow in FIG. 7 begins when the particular setting-screen displaying operation is performed while the printer driver 22 is being executed.

This flow in FIG. 7 begins with S110 at which the CPU 11 reads, from the HDD 14, the selected states determined at the last end, i.e., at the point in time when display of the driver screen 40 is finished in response to the last pressing of the OK button 5. As a result, the CPU 11 recognizes the setting values each of which is in the selected state at the last pressing of the OK button 5.

The CPU 11 at S120 reads the selection history information from the HDD 14. As a result, the CPU 11 recognizes contents to be displayed on the screen for the Quick Setting Selection tab 45. That is, the CPU 11 recognizes groups for the respective setting items for each of which at least setting value different from the default value has been determined, and the CPU 11 also recognizes, for each of the groups, the at least one setting value having been determined, as an option.

The CPU 11 at S130 controls the display device 16 to display the driver screen 40 thereon. Specifically, on the screen right block 3, all-contents displaying is performed for the Basic tab 41, and the selected state of the setting value for each of the setting item is set for the setting value recognized at S110 (i.e., the setting value determined at the last time). On the screen left block 4, the screen for the Quick Setting Selection tab 45 is displayed, and the groups and the options recognized at S120 are displayed on the screen for the Quick Setting Selection tab 45. For each of the groups, at this displaying, one of corresponding options which is in the selected state at the last determination is set to the selected state, and an icon indicating the option is displayed as the selected-state icon at the center.

The CPU 11 at S140 determines whether the user has operated the driver screen 40 or not. When an operation is performed by the user (S140: YES), the CPU 11 at S150 determines an area of the driver screen 40 on which the operation of the user is performed.

When the screen right block 3 is operated by the user, this flow goes to S160. When the screen left block 4 is operated by the user, this flow goes to S170. When the OK button 5 is pressed by the user, this flow goes to S180. Though not shown in FIG. 7, when the Cancel button 6 is pressed, the CPU 11 dismisses the driver screen 40, and this flow ends.

The CPU 11 at S180 determines the current selected state for each of the setting items and stores the current selected state into the HDD 14. The CPU 11 at S190 updates the selection history information based on the current display state of the screen for the Quick Setting Selection tab 45. That is, in the case where the options displayed as the selected state for the respective groups include an option not contained in the selection history information, the option is newly added as the selection history information.

Figure 8:
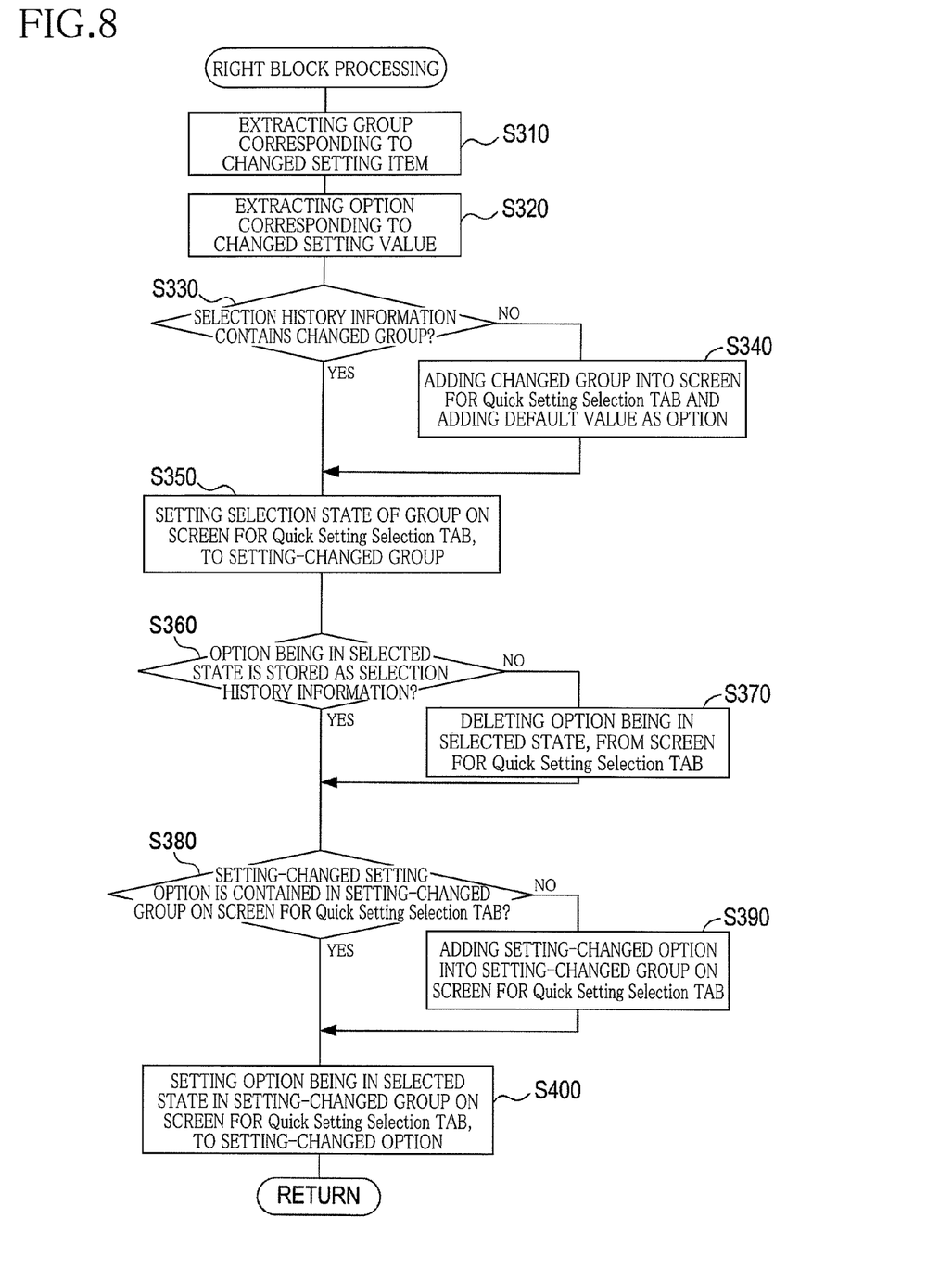
FIG. 8 is a flow chart illustrating a right block processing at S160 in FIG. 7.

FIG. 8 illustrates a flow of the right block processing at S160. This flow begins with S310 at which the CPU 11 extracts, from the selection history information, a group corresponding to the setting item changed in the screen right block 3. The CPU 11 at S320 extracts, from the selection history information, an option corresponding to a setting value for the setting item changed in the screen right block 3.

The CPU 11 at S330 determines whether the selection history information contains the group corresponding to the changed setting item or not, that is, the CPU 11 determines whether the group has been extracted at S310 or not. When the selection history information contains the group corresponding to the changed setting item, this flow goes to S350. When the selection history information does not contain the group corresponding to the changed setting item, the CPU 11 at S340 newly adds the group corresponding to the changed setting item into the screen for the Quick Setting Selection tab 45 and adds the default value as the option into the group (specifically, the CPU 11 displays the icon indicating the default value as the non-selected-state icon).

The CPU 11 at S350 sets a selection state of the group on the screen for the Quick Setting Selection tab 45, to the group for which the setting has been changed (hereinafter may be referred to as "setting-changed group").

The CPU 11 at S360 determines whether an option being currently in the selected state in the setting-changed group on the screen for the Quick Setting Selection tab 45 is an option stored as the selection history information or not. When the option being currently in the selected state in the setting-changed group on the screen for the Quick Setting Selection tab 45 is the option stored as the selection history information, this flow goes to S380. When the option being currently in the selected state in the setting-changed group on the screen for the Quick Setting Selection tab 45 is not the option stored as the selection history information, this flow goes to S370. The CPU 11 at S370 deletes the option being currently in the selected state in the setting-changed group, from the screen for the Quick Setting Selection tab 45.

The CPU 11 at S380 determines whether a setting value for which the setting has been changed (hereinafter may be referred to as "setting-changed setting value") is contained in the setting-changed group on the screen for the Quick Setting Selection tab 45 or not. When the setting-changed setting value is contained in the setting-changed group on the screen for the Quick Setting Selection tab 45, this flow goes to S400. When the setting-changed setting value is not contained in the setting-changed group on the screen for the Quick Setting Selection tab 45, this flow goes to S390. The CPU 11 at S390 adds the setting-changed option into the setting-changed group on the screen for the Quick Setting Selection tab 45.

The CPU 11 S400 sets an option being in the selected state in the setting-changed group on the screen for the Quick Setting Selection tab 45, to the setting-changed option. This flow then goes to S130 at which the CPU 11 controls the display device 16 to display the driver screen 40. Specifically, on the screen right block 3, the selected state of the setting value for each of the setting items is changed according to the user operation detected at S140. On the screen left block 4, the group added at S340 is displayed on the screen for the Quick Setting Selection tab 45, and one of a plurality of options of the setting-changed group which is set at S400 is deleted or added into the setting-changed group. In addition, one of the selected options is displayed in the selected state. As a result, the setting value whose setting has been changed on the screen right block 3 is displayed, as the option being in the selected state, on the screen for the Quick Setting Selection tab 45.

Figure 9:
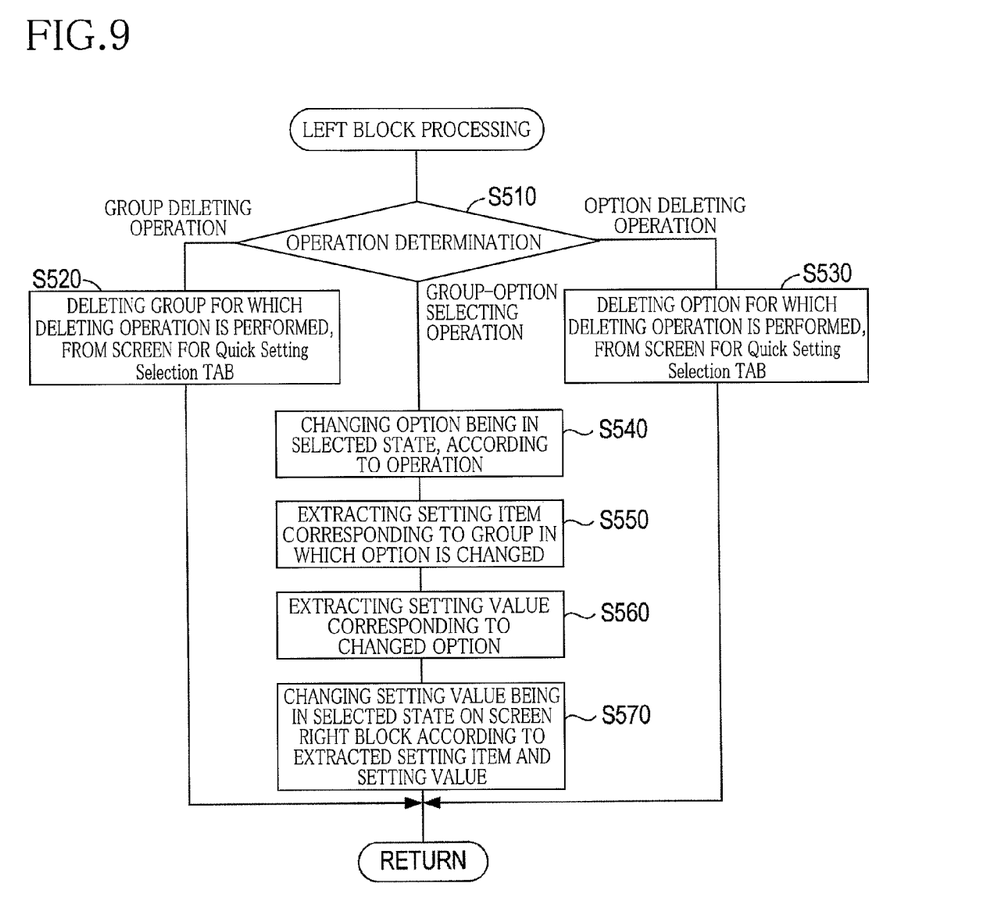
FIG. 9 is a flow chart illustrating a left block processing at S170 in FIG. 7.

FIG. 9 illustrates a flow of the left block processing at S170. This flow begins with S510 at which the CPU 11 executes an operation determination. In the operation determination, the CPU 11 determines a type of the operation performed on the screen left block 4. More specifically, the CPU 11 determines which operation has been performed among a group deleting operation for deleting a particular group, an option deleting operation for deleting a particular option, and a group-option selecting operation for changing an option in a particular group.

When the CPU 11 at S510 determines that the operation performed on the screen left block 4 is the group deleting operation, this flow goes to S520. The CPU 11 at S520 deletes a group for which the deleting operation is performed, from the screen for the Quick Setting Selection tab 45.

When the CPU 11 at S510 determines that the operation performed on the screen left block 4 is the option deleting operation, this flow goes to S530. The CPU 11 at S530 deletes an option for which the deleting operation is performed, from the screen for the Quick Setting Selection tab 45.

When the CPU 11 at S510 determines that the operation performed on the screen left block 4 is the group-option selecting operation, this flow goes to S540. The CPU 11 at S540 changes the option being in the selected state in the group to be operated, according to the operation performed by the user. The CPU 11 at S550 extracts a setting item corresponding to the group in which the option is changed at S540, from the setting items on the screen right block 3. The CPU 11 at S560 extracts a setting value corresponding to the option changed to the selected state at S540, from the settings values for the setting item extracted at S550. The CPU 11 at S570 changes the setting value being in the selected state for the setting item extracted at S550, to the setting value extracted at S560 on the screen right block 3. This flow thereafter goes to S130 at which the CPU 11 controls the display device 16 to display the driver screen 40 thereon. Specifically, on the screen for the Quick Setting Selection tab 45, one of the options or the group deleted at S520 or S530 from the screen left block 4 is deleted, and the selection state of the setting value is changed according to the setting item and the setting value extracted at S570.

(5) Effects of Embodiment

In the printer driver 22 in the present embodiment described above, the setting values each having been changed from the default value on the screen right block 3 are displayed as options also on the screen left block 4 in the state in which the Quick Setting Selection tab 45 is selected. On the screen for the Quick Setting Selection tab 45, the user can switch the option being in the selected state.

The options displayed on the screen for the Quick Setting Selection tab 45 are the setting values which are affected by the setting change history and cumulatively stored as the selection history information. Thus, the user can use the Quick Setting Selection tab 45 to easily and efficiently set the setting values as needed, improving usability.

When the option being in the selected state is switched on the screen for the Quick Setting Selection tab 45, the selected state of the setting value for the setting item is changed on the screen right block 3. That is, the selected state is always the same on both of the screens. This configuration allows the user to reliably recognize the current selected state.

When the setting value not contained in the Quick Setting Selection tab 45 is newly selected on the screen right block 3, the setting value is newly added as an option into the screen for the Quick Setting Selection tab 45 and displayed in the selected state. The newly added option may be kept as the option until the OK button 5 is thereafter pressed. In this case, the setting values changed before pressing of the OK button 5 are cumulatively added into the screen for the Quick Setting Selection tab 45, making it possible to change the selected state of each of the setting values using the Quick Setting Selection tab 45.

When a group is newly added into the screen for the Quick Setting Selection tab 45, and an option is added, a default value is also added as the option. With this configuration, in the case where the user wants to change a changed setting value back to the default value, the user can easily change the setting value back to the default value using the Quick Setting Selection tab 45.

The contents added to the screen for the Quick Setting Selection tab 45 can be deleted as needed. Specifically, the user can delete all the options at a time for each group and can delete the options individually. In the case where the setting values are frequently changed and determined, the number of options increases on the screen for the Quick Setting Selection tab 45, so that options not frequently used by the user may be kept displayed on the screen for the Quick Setting Selection tab 45. In the present embodiment, however, the user can delete the option, making it possible to keep displaying the appropriate number of options on the screen for the Quick Setting Selection tab 45.

In the present embodiment, the PC 10 is one example of a device control apparatus. The printer 30 is one example of a device. The CPU 11 of the PC 10 is one example of a computer and a controller. The printer driver 22 is one example of a device control program. The screen for the Basic tab 41 is one example of a first setting screen, and the screen for the Quick Setting Selection tab 45 is one example of a second setting screen. The default value is one example of a particular setting value. The HDD 14 is one example of a storage. Each of the icons indicating a corresponding one of the options displayed on the screen for the Quick Setting Selection tab 45 is one example of a selection image. The processing at S130 is one example of a first screen displaying process. The processing at S390 is one example of an option setting process. The processings at S400 and S130 are one example of a second screen displaying process. The processing at S190 is one example of a storing process. The processing at S400 is one example of a synchronization process. The processing at S140 is one example of a receiving process. The processing at S180 is one example of a determining process. The processings at S520 and 530 are one example of a selection canceling process. The processing at S510 is one example of a canceling-operation receiving process. The processings at S400 and S130 are one example of a selection canceling process.

Other Embodiments (1) Some or all of setting values not determined but temporality determined by the user may be stored as the selection history information in addition to the setting values previously determined. With this configuration, when displaying the driver screen 40, the CPU 11 can display not only the setting values previously determined but also the setting values temporarily selected, on the screen for the Quick Setting Selection tab 45 each as an option.

(2) In the above-described embodiment, in the case where a new group is added into the screen for the Quick Setting Selection tab 45 in response to first change of the setting value for a certain setting item from the default value to another setting value, the default value is also added into the group. However, it is not essential to add the default value into the group. Only the setting value changed and different from the default value may be added, as an option, into each of the groups on the screen for the Quick Setting Selection tab 45. In this case, however, in the case where the setting value changed from the default value is temporarily added to the screen for the Quick Setting Selection tab 45, but the user thereafter operates the screen right block 3 to change the setting value to the default value again, the default value may be added as an option into the group on the screen for the Quick Setting Selection tab 45.

(3) While three icons are displayable at the maximum at the same time for one group on the screen left block 4 in the above-described embodiment, but the present invention is not limited to this configuration. The number of icons displayable for one group at the same time may be determined as needed. Also, it is possible to determine how to determine the selection history on the screen for the Quick Setting Selection tab 45. Also, the arrangement, shape, and size of each tab on the driver screen 40 may be determined as needed.

(4) The selected state may be determined at a time different from pressing of the OK button 5. For example, the selected state may be determined when printing is actually instructed and performed by the printer 30 after pressing of the OK button 5.

(5) Application of the present invention is not limited to the PC 10, the printer 30, or the printer driver 22. The present invention may be applied to any configuration for controlling a device from an information processing device capable of executing a program.

(6) It is to be understood that the disclosure is not limited to the details of the illustrated embodiment, but may be embodied with various changes and modifications, which may occur to those skilled in the art, without departing from the spirit and scope of the disclosure. For example, a function of one constituent element in the above-described embodiment may be divided for a plurality of constituent elements, and functions of a plurality of constituent elements may be combined to form one constituent element. At least a portion of the configuration in the above-described embodiment may be replaced with a well-known configuration having a similar function. The configuration in the above-described embodiment may be partly omitted as long as the purpose of the present invention is attained. At least a portion of the configuration in the above-described embodiment may be added to or replaced with a configuration in said another embodiment, for example.

What is claimed is:

1. A non-transitory storage medium storing a plurality of instructions executable by a computer of a device control apparatus, the device control apparatus comprising a display and a storage configured to store a setting value for controlling a device,
    the plurality of instructions, when executed by the computer, causing the device control apparatus to execute:
        an option setting process in which when a setting value for a particular setting item of a plurality of setting items is changed from a particular setting value stored in the storage to a setting value as a changed setting value different from the particular setting value, the changed setting value is set as one of a plurality of options regarding setting values for the particular;
    a first screen displaying process in which the display displays a first setting screen thereon for designating the setting value for each of the plurality of setting items, and in which, in response to change of the setting value to the changed setting value, the display displays the changed setting value, in a designated state, in the first setting screen;
    a second screen displaying process in which, in response to the change of the setting value to the changed setting value, the display displays both of a particular setting image and a changed setting image in a second setting screen, the particular setting image corresponding to the particular setting value, the changed setting image corresponding to the changed setting image, the changed setting image and the changed setting value being simultaneously displayed in a designated state in the first setting screen and in the second setting screen respectively, the particular setting image being displayed in a non-designated state in the second setting screen; and
    a storing process in which, for the particular setting item, when the setting value is determined by a determining operation the determined setting value as the changed setting value is stored into the storage.

2. The non-transitory storage medium according to claim 1, wherein when the setting value, for the particular setting item, is changed from a first setting value as the changed setting value to a second setting value different from each of the particular setting value and the first setting value and when executed by the computer, the plurality of instructions cause the device control apparatus to:
    set the particular setting value, the first setting value, and the second setting value as the plurality of options in the option setting process; and
    control the display to display (i) the second setting value in the designated state and (ii) the particular setting value and the first setting value in the non-designated state in the second screen displaying process.

3. The non-transitory storage medium according to claim 1, wherein when executed by the computer, the plurality of instructions cause the device control apparatus to execute:
    a determining process in which when the determining operation is performed, a setting value displayed in the designated state on the second setting screen is determined as a control setting value, for the particular setting item, and a setting value displayed in the designated state on the first setting screen is determined as the control setting value, for each of at least one of the plurality of setting items which differs from the particular setting item; and
    the storing process in which, for the particular setting item corresponding to the changed setting value stored in the storage, when the particular setting value is changed to the changed setting value on the first setting screen, and the changed setting value is determined by the determining operation, the determined setting value is stored as the changed setting value into the storage.

4. The non-transitory storage medium according to claim 3, wherein when executed by the computer, the plurality of instructions cause the device control apparatus to display the setting value determined in a preceding determining process, in the designated state based on the changed setting value stored in the storage, at start of the first screen displaying process and the second screen displaying process.

5. The non-transitory storage medium according to claim 1, wherein when executed by the computer, the plurality of instructions cause the device control apparatus to execute a designation canceling process in which the device control apparatus cancels one of (i) a set state of a setting value being set as one of the plurality of options and (ii) set states of all setting values being set as the plurality of options.

6. The non-transitory storage medium according to claim 5, wherein when executed by the computer, the plurality of instructions cause the device control apparatus to execute a canceling-operation receiving process in which a designation canceling operation for canceling the designation canceling process is received.

7. The non-transitory storage medium according to claim 1,
wherein the plurality of options are associated with a plurality of setting images respectively indicating the plurality of options,
wherein the second setting screen contains a particular number of setting images comprising a first setting image associated with the one of the plurality of options which is in the designated state, and
wherein when executed by the computer, the plurality of instructions cause the device control apparatus to execute a designation switch process in which an image switching operation for switching the designated state from the one of the plurality of options to another of the plurality of options is received on the second setting screen, and the display displays, in the designated state, a second setting image associated with said another of the plurality of options.

8. A device control method, implementable by a computer of a device control apparatus, for setting a setting value for controlling a device connected to the device control apparatus,
the device control method comprising:
displaying a first setting screen on the display, the first setting screen for designating a first setting value for the particular setting item, the first setting value being different from a default setting value;
receiving a first input for designating the first setting value for the particular setting item through the first setting screen;
in response to receiving the first input, displaying the first setting value in a designated state in the first setting screen;
in response to receiving the first input, storing the first setting value in the storage in association with the particular setting item;
in response to receiving the first input, displaying both of a default setting image and a first setting image in a second setting screen on the display, the default setting image corresponding to the default setting value, the first setting image corresponding to the first setting value, the first setting image and the first setting value being simultaneously displayed in a designated state in the second setting screen and in the first setting screen, respectively, the default setting image being displayed in a non-designated state in the second setting screen;
receiving a second input for designating one of the default setting image and the first setting image through the second setting screen; and
determining the designated one of the default setting value and the first setting value for the particular setting item based on the received designation.

9. A device control apparatus comprising: a display; a storage storing a setting value for controlling a device and a plurality of instructions; and a processor,
the plurality of instructions, when executed by the processor, causing the device control apparatus to execute steps comprising:
displaying a first setting screen on the display, the first setting screen for designating a first setting value for the particular setting item, the first setting value being different from the default setting value;
receiving a first input for designating the first setting value for the particular setting item through the first setting screen;
in response to receiving the first input, displaying the first setting value in a designated state in the first setting screen;
in response to receiving the first input, storing the first setting value in the storage in association with the particular setting item;
in response to receiving the first input, displaying both of a default setting image and a first setting image in a second setting screen on the display, the default setting image corresponding to the default setting value, the first setting image corresponding to the first setting value, the first setting image and the first setting value being simultaneously displayed in a designated state in the second setting screen and in the first setting screen, respectively, the default setting image being displayed in a non-designated state in the second setting screen;
receiving a second input for designating one of the default setting image and the first setting image through the second setting screen; and
determining the designated one of the default setting value and the first setting value for the particular setting item based on the received designation.

10. A non-transitory storage medium storing instructions executable by a computer of a device control apparatus, the device control apparatus comprising a display and a storage storing a default setting value for a particular setting item,
the instructions, when executed by the computer, causing the device control apparatus to execute steps comprising:
displaying a first setting screen on the display, the first setting screen for designating a first setting value for the particular setting item, the first setting value being different from the default setting value;
receiving a first input for designating the first setting value for the particular setting item through the first setting screen;
in response to receiving the first input, displaying the first setting value in a designated state in the first setting screen;
in response to receiving the first input, storing the first setting value in the storage in association with the particular setting item;
in response to receiving the first input, displaying both of a default setting image and a first setting image in a second setting screen on the display, the default setting image corresponding to the default setting value, the first setting image corresponding to the first setting value, the first setting image and the first setting value being simultaneously displayed in a designated state in the second setting screen and in the first setting screen, respectively, the default setting image being displayed in a non-designated state in the second setting screen;
receiving a second input for designating one of the default setting image and the first setting image through the second setting screen; and
determining the designated one of the default setting value and the first setting value for the particular setting item based on the received designation.

11. The non-transitory storage medium according to claim 10, wherein the first setting image is displayed in the second setting screen in a highlighted manner.

12. The non-transitory storage medium according to claim 10, wherein the first setting value is displayed on the display in a first setting area of the first setting screen while the first setting image is displayed on the display in the second setting screen in a highlighted manner.

13. The non-transitory storage medium according to claim 10, wherein the instructions, when executed by the computer, causing the device control apparatus to further execute steps comprising:
    receiving a third input for removing the first setting value from the second setting screen; and
    in response to receiving the third input, deleting the first setting image from the storage.

14. The non-transitory storage medium according to claim 10, wherein the instructions, when executed by the computer, causing the device control apparatus to further execute steps comprising:
    displaying the first setting screen on the display for designating a second setting value for the particular setting item, the second setting value being different from the default setting value and the first setting value;
    receiving a fourth input for designating the second setting value for the particular setting item through the first setting screen; and
    in response to receiving the fourth input, displaying the second setting screen on the display, the second setting screen including a second setting area that shows the default setting value, the first setting value and a second setting image corresponding to the second setting value, the second setting image being displayed in a highlighted manner.

* * * * *